(12) United States Patent
Choi et al.

(10) Patent No.: US 12,260,498 B1
(45) Date of Patent: Mar. 25, 2025

(54) METHOD AND SYSTEM FOR IDENTIFYING AND TRACKING AN OBJECT IN SPACE AND GENERATING DIGITAL TWIN CONTENTS INCLUDING A CORRESPONDING OBJECT WITH REGARD TO THE SPACE

(71) Applicant: CORNERS CO., LTD., Seoul (KR)

(72) Inventors: Jang Won Choi, Seoul (KR); Min Woo Park, Seoul (KR); Dae Gyun Lee, Seoul (KR); Dong Oh Kim, Seoul (KR)

(73) Assignee: CORNERS CO., LTD., Seoul (KR)

( * ) Notice: Subject to any disclaimer, the term of this patent is extended or adjusted under 35 U.S.C. 154(b) by 0 days.

(21) Appl. No.: 18/426,897

(22) Filed: Jan. 30, 2024

(30) Foreign Application Priority Data

Dec. 13, 2023 (KR) .................. 10-2023-0180342

(51) Int. Cl.
| | |
|---|---|
| G06T 17/00 | (2006.01) |
| G06T 7/20 | (2017.01) |
| G06T 7/62 | (2017.01) |
| G06T 7/70 | (2017.01) |
| H04N 23/69 | (2023.01) |
| H04N 23/695 | (2023.01) |

(52) U.S. Cl.
CPC ............... *G06T 17/00* (2013.01); *G06T 7/20* (2013.01); *G06T 7/62* (2017.01); *G06T 7/70* (2017.01); *H04N 23/69* (2023.01); *H04N 23/695* (2023.01)

(58) Field of Classification Search
None
See application file for complete search history.

(56) References Cited

U.S. PATENT DOCUMENTS

| | | | |
|---|---|---|---|
| 11,640,694 B2 * | 5/2023 | Adkinson | G06T 7/579 345/419 |
| 12,094,134 B2 * | 9/2024 | Yoon | G06V 40/103 |
| 2024/0022830 A1 * | 1/2024 | Beziaeva | G06T 1/20 |

FOREIGN PATENT DOCUMENTS

| | | |
|---|---|---|
| KR | 10-2018-0027361 A | 3/2018 |
| KR | 10-2023-0013297 A | 1/2023 |
| KR | 10-2023-0020745 A | 2/2023 |

OTHER PUBLICATIONS

"Computer Vision Enabled Building Digital Twin Using Building Information Model", by Xiaoping Zhou et al., IEEE Transactions on Industrial Informatics, vol. 19, No. 3, Mar. 2023, pp. 2684-2692. (Year: 2023).*

(Continued)

*Primary Examiner* — James A Thompson
(74) *Attorney, Agent, or Firm* — WHDA, LLP

(57) ABSTRACT

Provided is a method of creating digital twin content for a space based on object recognition in the space. A method of creating digital twin content includes identifying, by a computer system, an object in a space using a camera, determining a value of a parameter associated with the camera to define (or display) the identified object with a predetermined first size at a predetermined location on an image captured by the camera or a screen on which the image is displayed, and using a control result value based on the determined value of the parameter and the location information of the identified object to create the digital twin content for the space.

9 Claims, 12 Drawing Sheets

(56) References Cited

OTHER PUBLICATIONS

"Image Recognition Technology and Digital Twin in the Power Industry", by S. Wang and Y. Zhao, 2023 IEEE 2nd International Conference on Electrical Engineering, Big Data and Algorithms (EEBDA), Feb. 24-26, 2023, pp. 1398-1401. (Year: 2023).*
Written Decision on Registration dated Jun. 25, 2024, issued in counterpart KR patent application No. 10-2023-0180342 with English translation (3 pages).
Request for the Submission of an Opinion dated Feb. 7, 2024, issued in counterpart KR patent application No. 10-2023-0180342 with English translation (10 pages).

* cited by examiner

[10:10:18] ["did":"816","zl":1.0,"tt_x":-3,"tt_y":-10,"objs":[{"h":800.0,"l":890.0,"oid":1,"t":100.0,"w":300.0}]}
UnityEngine.Debug:Log (object)

METHOD AND SYSTEM FOR IDENTIFYING AND TRACKING AN OBJECT IN SPACE AND GENERATING DIGITAL TWIN CONTENTS INCLUDING A CORRESPONDING OBJECT WITH REGARD TO THE SPACE

CROSS-REFERENCE TO RELATED APPLICATION

This application claims the priority benefit of Korean Patent Application No. 10-2023-0180342, filed on Dec. 13, 2023, in the Korean Intellectual Property Office, the disclosure of which is incorporated herein by reference.

BACKGROUND

1. Field of the Invention

The following example embodiments relate to a method and system for creating digital twin content including a correspondence object corresponding to an object in a corresponding space based on information acquired by tracking or identifying the object in the space through a camera.

2. Description of the Related Art

Digital twin refers to technology that allows various simulations to be performed by implementing an object identical or similar to the real world in a virtual space. For example, digital twin content for the real world may be created by three-dimensionally modeling a correspondence space corresponding to a space that corresponds to the real world, by replicating an object placed in the space as a correspondence object, and by placing the same in the correspondence space.

To create such digital twin content, there is a need to identify and track an object placed in the real world with a device such as a camera. To create the digital twin content related to the real world in which object(s) are placed and to represent a movement of the object(s) in a correspondence space corresponding to the real world, a plurality of cameras needs to be used, which leads to increasing cost and resources.

Therefore, there is a need for a method of creating digital twin content that may cover a wide range of space and may also minimize the number of cameras used.

Korean Patent Laid-Open Publication No. 10-2023-0020745 relates to a device performance evaluation apparatus and describes an apparatus for evaluating performance of devices using digital twin technology.

Information described above is provided to simply help understanding and may include contents that does not form a portion of the related art.

SUMMARY

Example embodiments may provide a method that may identify an object in a space using a camera, may determine a value of a parameter associated with the camera to define or display the identified object with a predetermined first size at a predetermined first location on an image captured by the camera or a screen on which the image is displayed, and may track the object such that the object may be defined or displayed on the image or on the screen with the first size at the first location under control of the camera based on the determined value of the parameter.

Example embodiments may provide a method that may use a control result value of rotation and a zoom level for a camera and locating information of an identified object to create digital twin content for a space in which the object is placed.

According to an aspect, there is provided a method of creating digital twin content for a space based on an object recognition in the space, performed by a computer system, the method including identifying an object in the space using a camera included in the computer system; determining a value of a parameter associated with the camera to define the identified object with a predetermined first size at a predetermined first location on an image captured by the camera of the computer system or a screen on which the image is displayed, the object being defined with the first size at the first location on the image or the screen by at least one of i) that the camera is rotated by a driving unit and ii) a zoom of the camera is adjusted, based on the determined value of the parameter; and using a control result value of the camera based on the determined value of the parameter and location information of the identified object on the image or the screen to create the digital twin content for the space, wherein the digital twin content includes a correspondence object corresponding to the identified object, and by iteratively performing the identifying, the determining, and the using as the object moves, the moving object is tracked to be defined with the first size at the first location on the image or the screen and a movement of the object is represented as a movement of the correspondence object in the digital twin content.

The parameter may include pan information, tilt information, and zoom information of the camera, in response to rotation of the camera or the computer system equipped with the camera as a motor of the driving unit is controlled by first rotation angle information of the camera based on the pan information and second rotation angle information of the camera based on the tilt information, the camera may be controlled to define the object at the first location on the image or the screen, as the camera is controlled to zoom out or zoom in according to the zoom information, the camera may be controlled to define the object with the first size at the first location on the image or the screen, and the digital twin content may be created by processing the first rotation angle information, the second rotation angle information, the zoom information, and the location information with a three-dimensional (3D) content creator.

The computer system and the driving unit may be configured to communicate through a first wireless communication scheme, and the computer system and the 3D content creator may be configured to communicate through a second wireless communication scheme.

The digital twin content may be created by operations performed by the 3D content creator, and the operations may include an operation of converting the location information to coordinates that represent a point on the object; an operation of converting the first rotation angle information and the second rotation angle information to a rotation value of a virtual camera that views the correspondence object for a y-axis and a rotation value of the virtual camera for an x-axis, respectively; an operation of converting the zoom information to a field of view (FOV) value of the virtual camera; an operation of determining reference coordinates of the correspondence object in a correspondence space corresponding to the space based on the virtual camera's rotation value for the y-axis and rotation value for the x-axis, the FOV value, and the coordinates; and an operation of creating the correspondence object as a 3D object based on the reference coordinates.

The operation of converting the location information to the coordinates may include an operation of converting distance information from an edge of the image or the screen included in the location information to the object and size information of the object to coordinates that represent vertices on the object, and the operation of determining the reference coordinates may determine a point at which a projection line from the virtual camera that passes through coordinates of a predetermined point on the object determined based on the coordinates interests the correspondence space as the reference coordinates.

The object may be a bounding box, the predetermined point on the object may be a center point of base of the bounding box, the reference coordinates may be world coordinates as coordinates in the correspondence space corresponding to the center point, and the correspondence object may be a hexahedron created based on the world coordinates.

A movement of the object in the space may be represented as a movement of the correspondence object in the correspondence space, and the operations may include an operation of creating a corresponding stationary object as a 3D object corresponding to a stationary object placed on the space in the correspondence space; an operation of creating a virtual plane associated with the corresponding stationary object; and an operation of determining a movement of the correspondence object in a height direction based on the virtual plane.

The operation of creating the virtual plane may create the virtual plane perpendicular to a surface of the correspondence space based on reference coordinates of the virtual camera that views the corresponding stationary object and reference coordinates of the stationary correspondence object.

The operation of creating the virtual plane may create the virtual plane perpendicular to a vector that connects the reference coordinates of the virtual camera that views the corresponding stationary object and the reference coordinates of the stationary correspondence object.

The operation of determining the movement the correspondence object in the height direction may determine that the correspondence object moves in the height direction in at least one of a case in which a distance between the correspondence object and the virtual plane is less than a predetermined first distance and a case in which an amount of change in the zoom information or the FOV value for an amount of change in coordinates of the object according to the movement of the object is less than a predetermined second value, and a movement of the correspondence object in the height direction in the correspondence space may be represented.

According to some example embodiments, it is possible to create digital twin content that represents a movement of a correspondence object corresponding to a movement of an object by back-calculating pan, tilt, and zoom level control values of a virtual camera that tracks the correspondence object corresponding to the object in a correspondence space corresponding to a space from rotation and zoom level control result values (e.g., pan, tilt, and zoom level control values) for a camera used to track the movement of the object in the space and location information of the object.

Also, according to some example embodiments, it is possible to create digital twin content that covers a wider space using a smaller number of cameras by tracking an object using a camera of which rotation and/or a zoom level is automatically controlled according to a movement of the object rather than using a camera with a fixed FOV.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

These and/or other aspects, features, and advantages of the invention will become apparent and more readily appreciated from the following description of embodiments, taken in conjunction with the accompanying drawings of which:

FIG. 7 illustrates information transmitted from a computer system to a content creator to create digital twin content according to an example embodiment;

DETAILED DESCRIPTION

Figure 1:
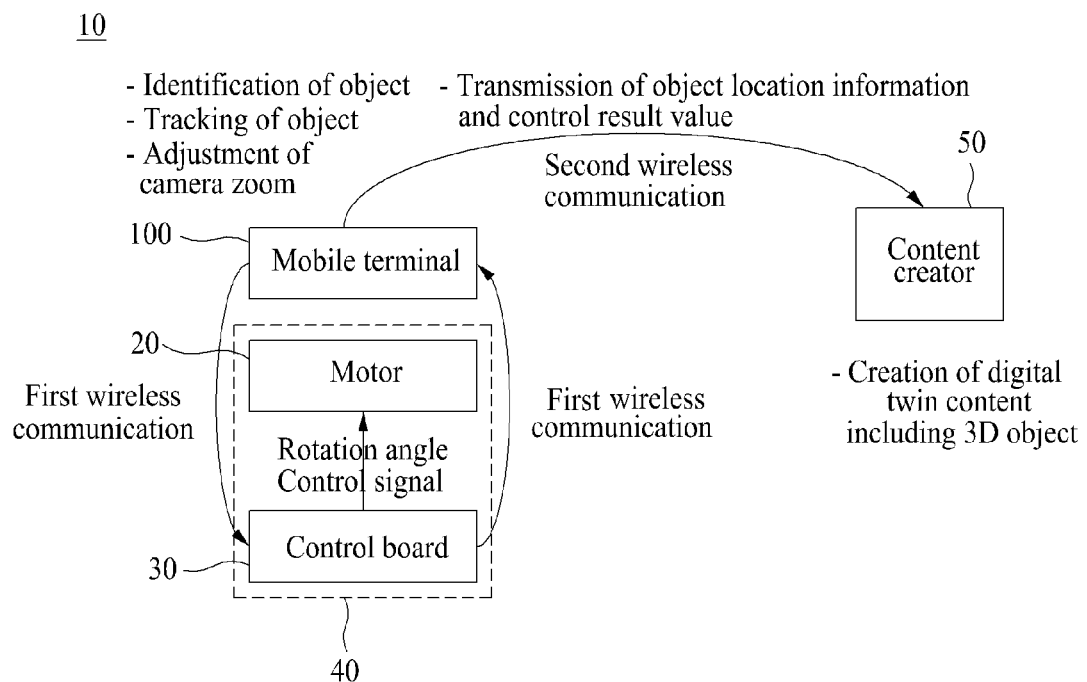
FIG. 1 illustrates a method of creating digital twin content for a space through an interaction among a computer system including a camera, a driving unit for controlling the camera, and a content creator according to an example embodiment.

Hereinafter, example embodiments will be described with reference to the accompanying drawings. Like reference numerals illustrated in each drawing refer to like elements throughout.

FIG. 1 illustrates a method of creating digital twin content for a space through an interaction among a computer system including a camera, a driving unit for controlling the camera, and a content creator according to an example embodiment.

A method of tracking an object using a camera of which rotation and/or a zoom level is automatically controlled according to a movement of the object rather than using a camera with a fixed field of view (FOV) and creating digital twin content based on the tracked object is described with reference to FIG. 1.

FIG. 1 illustrates a mobile terminal 100 as a computer system that includes a camera. In the following description, the computer system 100 may be used to refer to the mobile terminal 100.

A rotation of the camera of the computer system 100 may be controlled by a driving unit 40. For example, the computer system 100 or the camera thereof may be mounted to the driving unit 40. For example, the driving unit 40 may be configured to rotate the camera by holding the computer system 100 or the camera in a clamp-like form, or may be configured to rotate the camera by including a housing for accommodating the computer system 100 or the camera and by rotating the housing.

For example, the driving unit 40 may be configured to rotate the camera in directions of three axes (x, y, and z; or yaw or pan, pitch or tilt, and roll). The driving unit 40 may include a motor 20 for rotating the camera and a control board 30 for creating a control signal (rotation angle control signal) to control the motor 20. The motor 20 may be, for example, a servo motor. The servo motor may be configured to rotate the camera in a pan direction and/or a tilt direction in response to the rotation angle control signal. The control board 30 may include an Arduino board. The control board 30 may be configured to create a control signal (the aforementioned rotation angle control signal) for changing an angle of the camera.

Meanwhile, depending on example embodiments, the driving unit 40 may be a portion of the computer system 100, and the driving unit 40 and the computer system 100 may constitute a single computer system 100 or edge device (e.g., as a single board computer).

In an example embodiment, the computer system 100 may identify (i.e., detect) an object in a space and may track the object. Here, the computer system 100 may rotate the camera (through the driving unit 40) to track the object and may adjust a zoom level of the camera. For example, the computer system 100 may be configured to communicate with the driving unit 40 through a first wireless communication scheme, and may transmit a value of a parameter associated with rotation of the camera to the driving unit 40. The first wireless communication scheme may be, for example, a Bluetooth scheme. The control board 30 may create a rotation angle control signal based on the received value of the parameter and may control the motor 20 to rotate the camera. Accordingly, the computer system 100 may appropriately track the object using the camera. Meanwhile, the driving unit 40 may transmit a control result value that includes a rotation angle of the camera to the computer system 100 through the first wireless communication scheme.

The computer system 100 may use the received control result value, a control result value for a zoom level, and location information of the tracking object to create the digital twin content. For example, the computer system 100 may transmit the control result value and the location information of the object to a content creator 50 (also, referred to as a 3D content creator). The control result value may include, for example, a pan angle value at which the camera is rotated, a tilt angle value, and an adjusted zoom level value. Meanwhile, the computer system 100 and the content creator 50 may be configured to communicate through a second wireless communication scheme. The second wireless communication scheme may include, for example, any near distance wireless communication scheme, a local area network (LAN), and any far distance wireless communication scheme. The content creator 50 may create digital twin content that includes a virtual object, a correspondence object, corresponding to an object in space based on information transmitted from the computer system 100. The correspondence object may be a 3D virtual object corresponding to the object in the space.

The content creator 50 may be a separate (or remote) computer system from the computer system 100. The content creator 50 may be a server. The content creator 50 may include a program, software (e.g., control S/W), or an application to create the digital twin content. Alternatively, depending on example embodiment, the content creator 50 may be implemented as a part of the computer system 100.

The content creator 50 may back-calculate pan, tilt, and zoom level control values of a virtual camera that tracks a correspondence object corresponding to an object in a correspondence space corresponding to a space from rotation and zoom level control result values (e.g., pan, tilt, and zoom level control values) for the camera of the computer system 100 used to track a movement of the object in the space and location information of the object, and may create the digital twin content that represents the movement of the correspondence object corresponding to the movement of the object.

As a result, according to an example embodiment, it is possible to effectively track the movement of the object in the space with a small number of cameras and to create digital twin content that represents a movement of the object.

A method of tracking, by the computer system 100, an object in a space by controlling rotation and a zoom level of the camera through the driving unit 40 and a method of creating digital twin content that represents a movement of a virtual object (i.e., correspondence object) corresponding to a movement of the object will be further described with reference to FIGS. 2 to 13.

Figure 2:
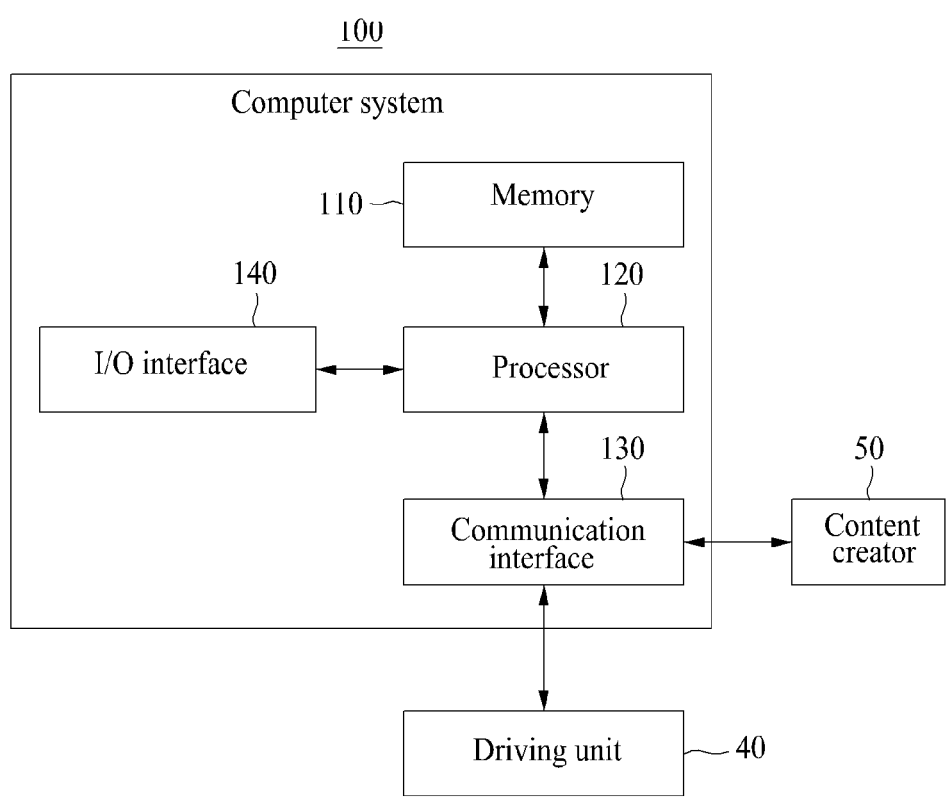
FIG. 2 is a block diagram illustrating a computer system that communicates with a driving unit and a content creator according to an example embodiment.

FIG. 2 is a block diagram illustrating a communication system that communicates with a driving unit and a content creator according to an example embodiment.

The mobile terminal 100 described above with reference to FIG. 1 according to example embodiments may be the computer system 100. For example, a computer program for implementing a method of example embodiments may be installed and run on the computer system 100. The computer system 100 may perform a method of creating digital twin content according to example embodiments under control of the running computer program.

At least some operations of the method of creating digital twin content according to the example embodiments may be performed through a dedicated application of a mobile terminal (smart device). For example, the operations may be configured in a form of a program that independently operates or may be configured in an in-app form of a specific application to be operable on the specific application. The specific application may be installed on the computer system 100 and may execute a camera to provide a function of tracking an object in a space.

The computer system 100 refers to an electronic device and may be a smartphone capable of installing and executing an application or a program and a device similar thereto. Also, the computer system 100 may be, for example, a personal computer (PC), a notebook computer, a laptop computer, a tablet, an Internet of things (IoT) device, or a wearable computer. For example, the computer system 100 may be an augmented reality (AR) glass/glasses (smart glass/glasses) as the wearable device.

As illustrated, the computer system 100 may include a memory 110, a processor 120, a communication interface 130, and an input/output (I/O) interface 140. Also, although not illustrated, the computer system 100 may include at least one camera.

The memory 110 may include a permanent mass storage device, such as a random access memory (RAM), a read only memory (ROM), and a disk drive, as a non-transitory computer-readable record medium. Here, the permanent mass storage device, such as ROM and a disk drive, may be included in the computer system 100 as a permanent storage device separate from the memory 110. Also, an OS and at least one program code may be stored in the memory 110. Such software components may be loaded to the memory 110 from another non-transitory computer-readable record medium separate from the memory 110. The other non-transitory computer-readable record medium may include a non-transitory computer-readable record medium, for example, a floppy drive, a disk, a tape, a DVD/CD-ROM drive, a memory card, etc. According to other example embodiments, software components may be loaded to the memory 110 through the communication interface 130, instead of the non-transitory computer-readable record medium. For example, the software components may be loaded to the memory 110 of the computer system 100 based on a computer program installed by files received over a network.

The processor 120 may be configured to process instructions of a computer program by performing basic arithmetic operations, logic operations, and I/O operations. The computer-readable instructions may be provided from the memory 110 or the communication interface 130 to the processor 120. For example, the processor 120 may be configured to execute received instructions in response to the program code stored in a storage device, such as the memory 110.

That is, the processor 120 may manage constituent elements of the computer system 100 and may execute a program or an application used by the computer system 100. For example, the processor 120 may be configured to execute an application for performing operations of the method of creating digital twin content of the example embodiment and to process data for providing an object tracking function. Also, the processor 120 may process an operation required for executing the program or the application and for processing data, and may be at least one processor (CPU and/or GPU) of the computer system 100 or at least one core within the processor.

The communication interface 130 may provide a function for communication between the communication system 100 and another device (not shown) over the network. For example, the processor 120 of the computer system 100 may forward a request or an instruction created based on a program code stored in the storage device such as the memory 110, data, and a file, to other devices over the network under control of the communication interface 130. Inversely, a signal, an instruction, data, a file, etc., from another computer system may be received at the computer system 100 through the communication interface 130 of the computer system 100 over the network. For example, a signal, an instruction, data, etc., received through the communication interface 130 may be forwarded to the processor 120 or the memory 110, and a file, etc., may be stored in a storage medium, for example, the permanent storage device, further includable in the computer system 100. For example, the communication interface 130 may be a hardware module, such as a network interface card, a network interface chip, and a networking interface port of the computer system 100 or a software module, such as a network device driver or a networking program. As illustrated, the computer system 100 may communicate with the content creator 50 and the driving unit 40 through the communication interface 130. The communication interface 130 may include a first module for wireless communication of the first wireless communication scheme and a second module for wireless communication of the second wireless communication scheme, which is described above.

The I/O interface 140 may be a device used for interfacing with an I/O device. For example, an input device may include a device, such as a microphone, a keyboard, a mouse, etc., and an output device may include a device, such as a display, a speaker, etc. As another example, the I/O interface 140 may be a device for interfacing with a device in which an input function and an output function are integrated into a single function, such as a touchscreen. The I/O device may be configured as a single device with the computer system 100.

According to other example embodiments, the computer system 100 may include the number of components greater than or less than the number of components shown in FIG. 2. However, there is no need to clearly illustrate many components according to the related art. For example, the computer system 100 may include at least a portion of I/O devices connected to the I/O interface 140, or may further include other components, for example, a transceiver, a global positioning system (GPS) module, a camera, various types of sensors, a database, etc. In detail, when the computer system 100 is implemented in a form of a mobile device, such as a smartphone, various components, such as an acceleration sensor or a gyro sensor, various types of physical buttons, a button using a touch panel, an I/O port, a vibrator for vibration, etc., may be configured to be further included in the computer system 100.

Meanwhile, the content creator 50 may include components similar to the computer system 100 and repeated description related thereto is omitted.

In the following detailed description, for clarity of description, example embodiments are described based on the computer system 100 corresponding to the mobile terminal 100 and description related to an operation on the side of other components (40, 50) is briefly made or omitted.

Also, in the following detailed description, for clarity of description, operations performed by a component (e.g., processor, etc.) of the computer system 100 (or, content creator 50, driving unit 40) may be described to be performed by the computer system 100 (or content creator 50, driving unit 40).

Description related to technical features made above with reference to FIG. 1 may apply as is to FIG. 2 and thus, repeated description is omitted.

Figure 3A:
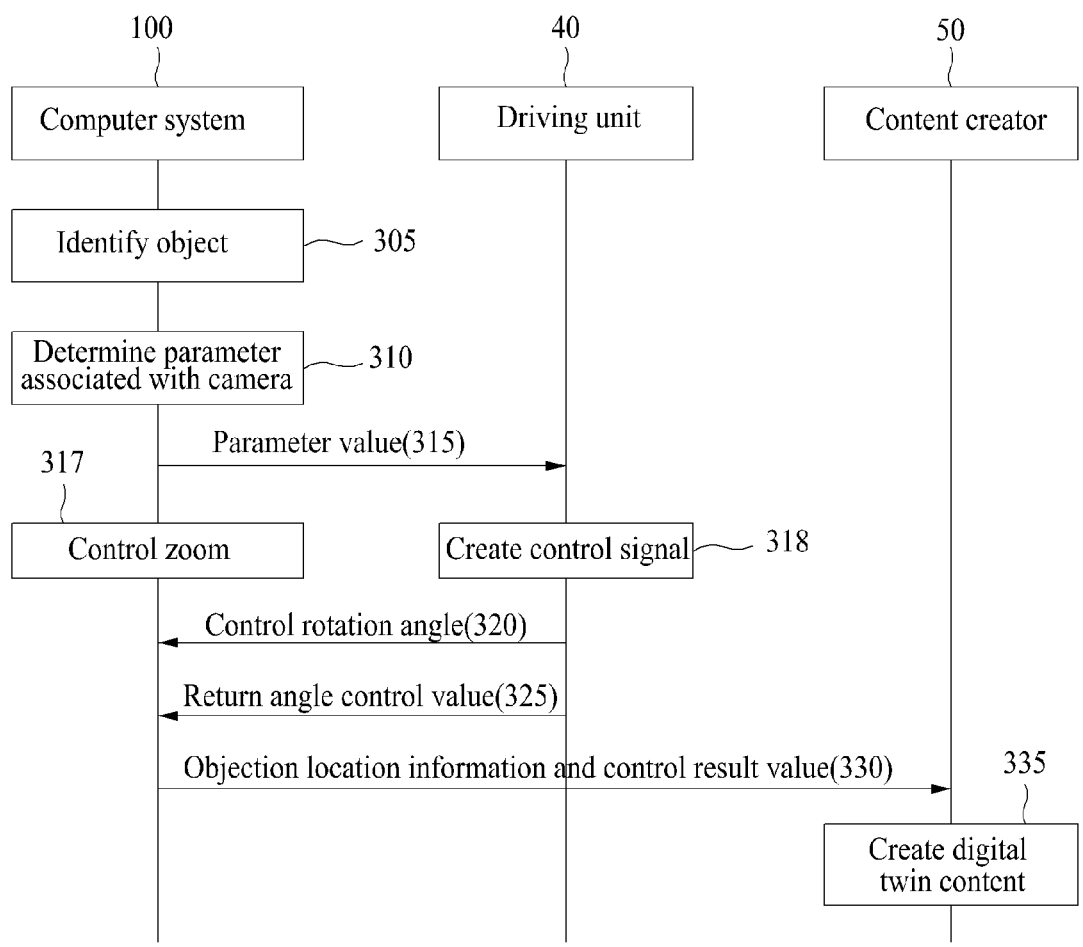
FIG. 3A is a flowchart illustrating a method of creating digital twin content for a space through an interaction among a computer system including a camera, a driving unit for controlling the camera, and a content creator according to an example embodiment.

FIG. 3A is a flowchart illustrating a method of creating digital twin content for a space through an interaction among a computer system including a camera, a driving unit for controlling the camera, and a content creator according to an example embodiment.

A method of creating digital twin content for a corresponding space based on object recognition in the space, performed by the computer system 100 is described with reference to FIG. 3A.

In operation 305, the computer system 100 may identify an object in a space using a camera. Identification of the object may represent recognition or detection of the object.

For example, an artificial intelligence (AI) model or a machine learning model pretrained for detection of the object may be used to detect the object. The computer system 100 may detect the object from an image captured through the camera, using the pretrained model and may extract information on the corresponding object (e.g., type and location information (coordinates, etc.) of the object).

In an example embodiment, the computer system 100 may acquire location information (e.g., coordinates, etc.) of the object on the image captured by the camera or a screen on which the corresponding image is displayed, as location information of the identified object.

Alternatively, in addition to using the pretrained model, any object detection technology may be used for object identification of the computer system 100 of the example embodiment.

In operation 310, the computer system 100 may determine a value of a parameter associated with the camera to define (or display) the identified object with a predetermined first size at a predetermined first location on the image captured by the camera of the computer system 10 or the image on which the image is displayed.

The computer system 100 may control the camera such that the identified object may be displayed with a predetermined size, the first size, at a specific location, the first location, on the captured image or the screen on which the corresponding image is displayed. Here, the first location may be, for example, a center area of the image or the screen. Meanwhile, the first size may be a preset size and may correspond to a size of the object suitable for visual recognition by the user.

To define (or display) the identified object at the first location on the image or the screen, the camera may need to be rotated to an appropriate angle. The computer system 100 may determine a value of a parameter indicating how much the camera needs to be rotated to display the identified object at the first location as the value of the parameter associated with the camera. This rotation may be rotation in directions of three axes of the camera (x, y, and z; or yaw or pan, pitch or tilt, and roll). For example, the parameter may include pan information and tilt information. The pan information may indicate a pan angle (i.e., yaw angle) to which the camera needs to rotate to define the object at the first location. For example, an angle indicated by the pan information may indicate a rotation angle of the camera based on the y-axis. The tilt information may indicate a tilt angle (i.e., pitch angle) to which the camera may need to rotate to define the object at the first location. For example, an angle indicated by the pitch information may indicate a rotation angle of the camera based on the x-axis.

Rotation of the camera based on the value of the parameter may be performed by the driving unit 40. In operation 315, the computer system 100 may transmit the determined value of the parameter to the driving unit 40 (e.g., the pan information and/or the tilt information as the value of the parameter associated with rotation of the camera required to define the identified object at the first location). For example, the computer system 100 may transmit the value of the parameter associated with rotation of the camera to the control board 30 of the driving unit 40 through the first wireless communication scheme. The driving unit 40 (control board 30) may create a control signal for controlling the motor 20 based on the received value of the parameter in operation 318 and may transmit the control signal to the motor 20 to control the motor 20, thereby controlling a rotation angle of the camera in operation 320. Therefore, the camera may be rotated to an appropriate pan angle and/or tilt angle to define the object at the first location. In operation 325, the driving unit 40 (control board 30) may transmit (i.e., return) a control result value for the camera, a controlled rotation angle of the camera (i.e., the rotated pan angle and/or tilt angle), to the computer system 100.

Also, to define (or display) the identified object with the first size on the image or the screen, zoom (i.e., zoom level) of the camera may need to be controlled to an appropriate level. The computer system 100 may determine a value of a parameter indicating how much the camera needs to zoom in or zoom out to display the identified object with the first size, as the value of the parameter associated with the camera. For example, the parameter may include zoom information. The zoom information may i a zoom level to which the camera needs to be adjusted to define the object with the first size. If the identified object is far away and displayed smaller than the first size, the zoom information may indicate zoom-in to a specific zoom level. If the identified object is close and displayed larger than the first size, the zoom information may indicate zoom-out to a specific zoom level.

Zoom (level) adjustment of the camera based on the value of the parameter may be performed by the computer system 100. In operation 317, the computer system 100 may control a zoom level of the camera according to the determined value of the parameter (e.g., the zoom information as the value of the parameter associated with the zoom level of the camera required to define the identified object with the first size). Therefore, the camera may define the identified object with the first size.

As described above, by performing operations 310 to 320, the computer system 100 may define the identified object with the first size at the first location on the image or the screen. Meanwhile, although not illustrated, zoom control may be performed simultaneously with controlling the rotation angle or may be performed after controlling the rotation angle.

As described above, the identified object may be defined with the first size at the first location on the image captured by the camera or the screen on which the image is displayed by at least one of i) that the camera is rotated by the driving unit 40 and ii) a zoom of the camera is adjusted by the computer system 100, based on the value of the parameter determined in operation 310.

The computer system 100 may use a control result value of the camera (i.e., the aforementioned control result of the rotation angle and/or control result of the zoom level) based on the value of the parameter determined in operation 310 and the location information of the identified object on the image or the screen to create the digital twin content for the space in which the object is placed. For example, as in operation 330, the computer system 100 may transmit the control result value for the camera and the location information of the object to the content creator 50. That is, the aforementioned "use" of information may include transmitting the corresponding information to the content creator 50 to create the digital twin content. Communication between the computer system 100 and the content creator 50 may be performed through a second wireless communication scheme. Also, the aforementioned "use" of information may refer to processing information (data) for transmission to the content creator 50. For example, such processing may refer to processing information (data) in a form of a message 700 (i.e., message queuing telemetry transport (MQTT) information), which is described below with reference to FIG. 7.

In operation 335, the content creator 50 may create the digital twin content based on the received result value for the camera and location information of the object.

The created digital twin content may include a correspondence object corresponding to the object identified by the camera. That is, the content creator 50 may create the digital twin content that includes a virtual object, the correspondence object, corresponding to the object in the space based on information received from the computer system 100. The correspondence object may be a 3D virtual object corresponding to the object in the space. The correspondence object may be represented in a correspondence space that is a 3D virtual space corresponding to the space.

In the digital twin content created for the space, a movement of the object in the space may be represented as a movement of the correspondence object.

The movement of the object may be a 3D movement of the object in the space. Meanwhile, the movement of the object recognized by the computer system 100 may be a change in a 2D location of the object on the image or the screen.

When the object moves in the space, the computer system 100 may control the camera to identify and track the object. Although the object moves, the computer system 100 may control the camera to track the object such that the object is defined with the first size at the first location on the image or the screen. To define the object with the first size at the first location, rotation of the camera may be controlled by the driving unit 40. That is, the aforementioned operations 305 to 335 may be iteratively performed to identify and track the object, and rotation and/or zoom level of the camera may be controlled to define the moving object with the first size at the first location according to an interaction among the computer system 100, the driving unit 40, and the content creator 50. Here, the digital twin content that represents the movement of the object as the movement of the correspondence object may be created.

For example, by iteratively performing operation 305 of identifying the object as the object moves in the space, operation 310 of determining the parameter, and operation 330 of using (or transmitting) information, the moving object may be tracked to be defined (or displayed) with the first size at the first location on the image or the screen and the movement of the object may be represented as the movement of the correspondence object in the digital twin content.

As described above, in an example embodiment, the object may be actively tracked by controlling the driving unit 40 such that the camera of the computer system 100 may actively rotate or/additionally the zoom level may be actively adjusted, and the digital twin content including the correspondence object may be created through such active tracking of the object. Therefore, the example embodiment may create the high-quality digital twin content using a smaller number of cameras while covering a wide space compared to a case of creating the digital twin content by recognizing the object with cameras having a fixed FOV.

Figure 3B:
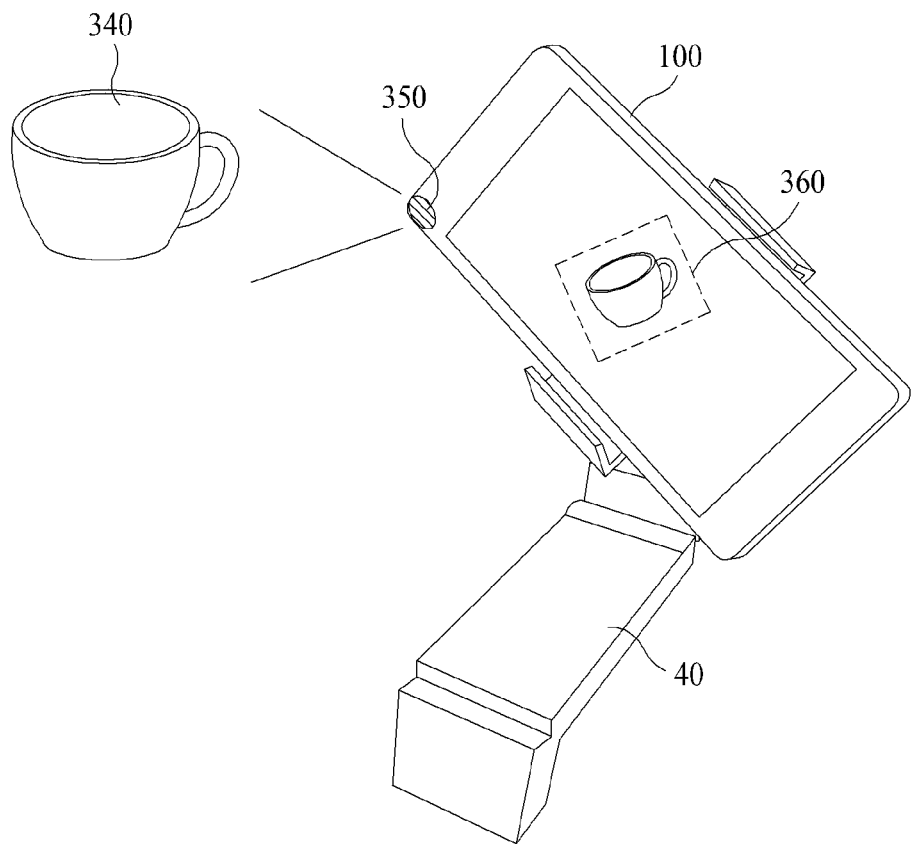
FIG. 3B illustrates a method of tracking an object in a space by a computer system including a camera according to an example.

Meanwhile, FIG. 3B illustrates a method of tracking an object in a space by a computer system including a camera according to an example.

FIG. 3B illustrates an example of a method of tracking an object 340 in real time by the computer system 100.

FIG. 3B illustrates the mobile terminal 100, such as a smartphone, as an example of the computer system 100. A camera 350 may be a front camera and/or a rear camera included in the mobile terminal 100. The driving unit 40 may be configured such that the camera 350 or the mobile terminal 100 may be mounted, and may be configured to rotate the camera 350 or the mobile terminal 100 in directions of three axes (x, y, and z; or yaw or pan, pitch or tilt, and roll).

The mobile terminal 100 may identify the object 340 in the space using the camera 350 and may display an identified object 360 on a screen. The identified object 360 may be displayed (defined) on the screen with a bounding box. The mobile terminal 100 may display the identified object 360 with a predetermined size, a first size, at a predetermined location, a first location, on the screen (e.g., center area on the screen).

When a location of the object 340 changes or when the object 340 moves, the mobile terminal 100 may determine a value of a parameter for displaying the identified object 360 with the first size at the first location on the screen and accordingly, a zoom level of the camera 350 and/or a rotation angle of the camera 350 by the driving unit 40 may be controlled. That is, in response to the movement of the object 340, the zoom level and/or the rotation angle may be actively controlled and the mobile terminal 100 may track the object 340 in real time and may display the same with the first size at the first location on the screen.

Describing an example for tracking the object 340, the parameter associated with the camera 350 to define the identified object 360 with the first size at the first location may include pan information, tilt information, and zoom information of the camera 350. Here, the motor 20 of the driving unit 40 may be controlled by first rotation angle information of the camera 350 based on the pan information and second rotation angle information of the camera 350 based on the tilt information, and accordingly the camera 350 or the computer system 100 that includes the camera 350 may rotate. As such, the camera 350 may be controlled to define the identified object 360 at the first location on the image or the screen. Meanwhile, as the camera 350 is controlled to zoom out or zoom in according to the zoom information, the camera 350 may be controlled to define the identified object 360 with the first size at the first location on the image or the screen.

Meanwhile, the digital twin content created for the space in which the object 340 is placed may represent a movement of the object 340 as a movement of the correspondence object. The digital twin content may be created by processing the first rotation angle information, the second rotation angle information, the zoom information, and the location information of the identified object 360 using the (3D) content creator 50. The location information of the identified object 360 may represent a location (or coordinates) of the identified object 360 on the screen of the computer system 100 or the image displayed on the screen.

A method of creating the digital twin content is further described below with reference to FIGS. 4 to 13.

Description related to technical features made above with reference to FIGS. 1 and 2 may apply as is to FIGS. 3A and 3B and thus, repeated description is omitted.

Figure 4:
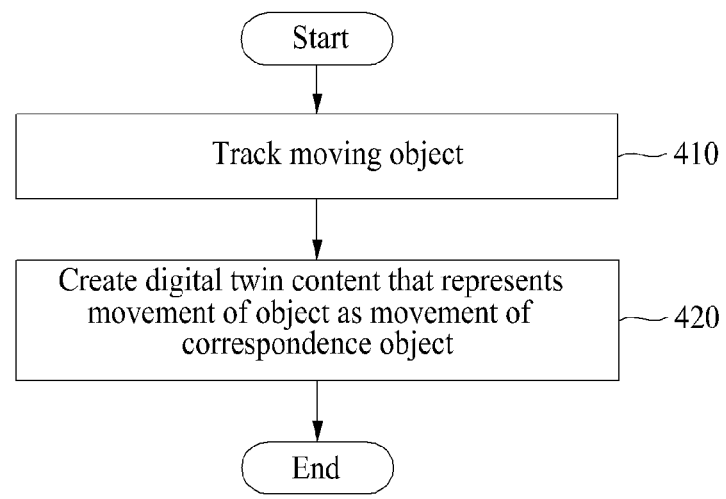
FIG. 4 is a flowchart illustrating a method of identifying and tracking an object moving in a space and creating digital twin content that represents a movement of the object as a movement of a correspondence object according to an example embodiment.

FIG. 4 is a flowchart illustrating a method of identifying and tracking an object moving in a space and creating digital twin content that represents a movement of the object as a movement of a correspondence object according to an example embodiment.

In operation 410, the computer system 100 may track the moving object 340 by controlling a rotation angle of the camera 350 and a zoom level of the camera 350 through an operation of the driving unit 40.

The computer system 100 may use a control result value for the camera 350 and location information of the identified object 360 to create digital twin content. For example, the computer system 100 may transmit the control result value for the camera 350 and location information of the identified object 360 to the content creator 50 that creates the digital twin content.

In operation 420, the content creator 50 may create the digital twin content that represents a movement of the object 340 as a movement of the correspondence object by processing the control result value and the location information.

The content creator 50 may create the digital twin content that represents the movement of the correspondence object corresponding to the movement of the object 340 by back-calculating pan, tilt, and zoom level control values of a virtual camera that tracks the correspondence object corresponding to the object 340 from the control result value and the location information.

A method of creating the digital twin content through the back-calculation is further described with reference to FIGS. 5 to 13.

Description related to technical features made above with reference to FIGS. 1 to 3 may apply as is to FIG. 4 and thus, repeated description is omitted.

Figure 5:
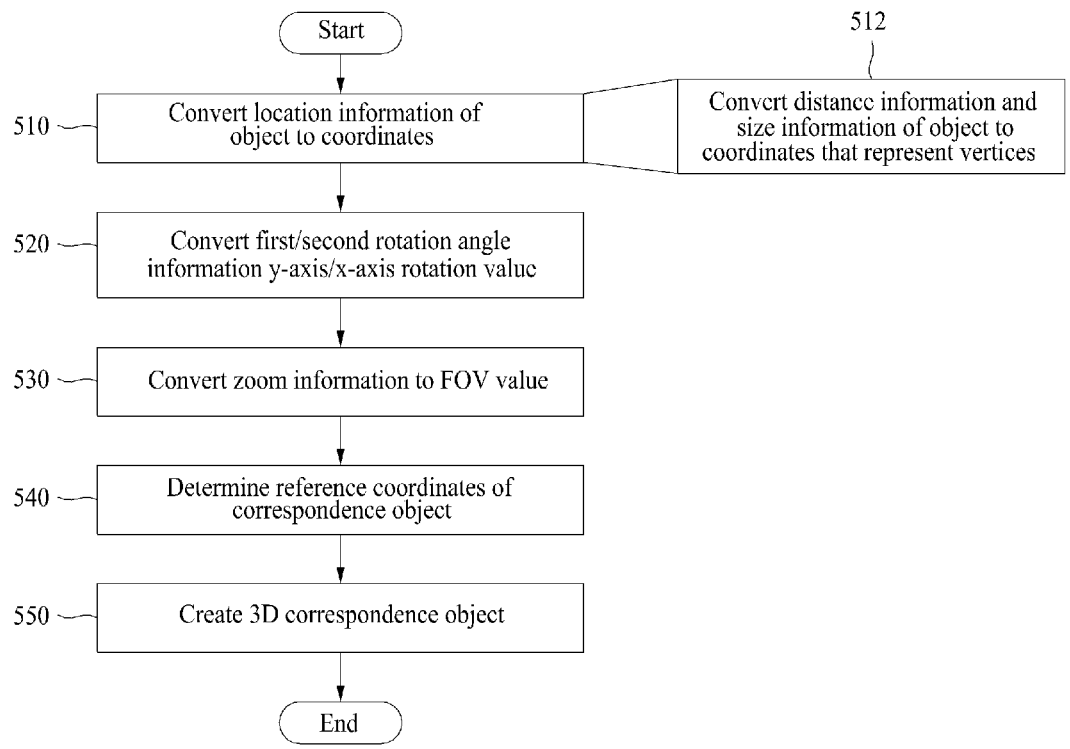
FIG. 5 is a flowchart illustrating a method of creating digital twin content for a space by a content creator according to an example.

FIG. 5 is a flowchart illustrating a method of creating digital twin content for a space by a content creator according to an example.

A method of creating, by the (3D) content creator 50, the digital twin content is further described with reference to FIG. 5.

The content creator 50 may acquire a control result value for the camera 350 and location information of the identified object 360 from the computer system 100. The digital twin content may be created by processing information acquired from the computer system 100 through operations 510 to 550.

In this regard, FIG. 7 illustrates information transmitted from a computer system to a content creator to create digital twin content according to an example embodiment.

Information transmitted from the computer system 100 to the content creator 50 may be defined using a messaging protocol, for example, MQTT. For example, information transmitted from the computer system 100 to the content creator 50 may be in the same form as the message 700 (i.e., MQTT information) of FIG. 7.

The message 700 may include an ID of the computer system 100 or the camera 350, zoom level information (zl), x-axis rotation angle information (tt_x) of the camera 350, y-axis rotation angle information (tt_y) of the camera 350, and location information (objs) of the identified object 360.

The location information of the identified object 360 may be location information of the bounding box of the identified object 360.

In operation 510, the content creator 50 may convert the received location information of the identified object 360 to coordinates that represent a point on the identified object 360. The point on the identified object 360 may be a vertex of the identified object 360, that is, a vertex of the bounding box of the identified object 360. As in operation 512, for example, the content creator 50 may convert distance information from an edge of the image or the screen to the identified object 360, included in the location information of the identified object 360 and size information of the identified object 360 to coordinates that represent vertices of the identified object 360 (vertices of the bounding box).

Figure 8:
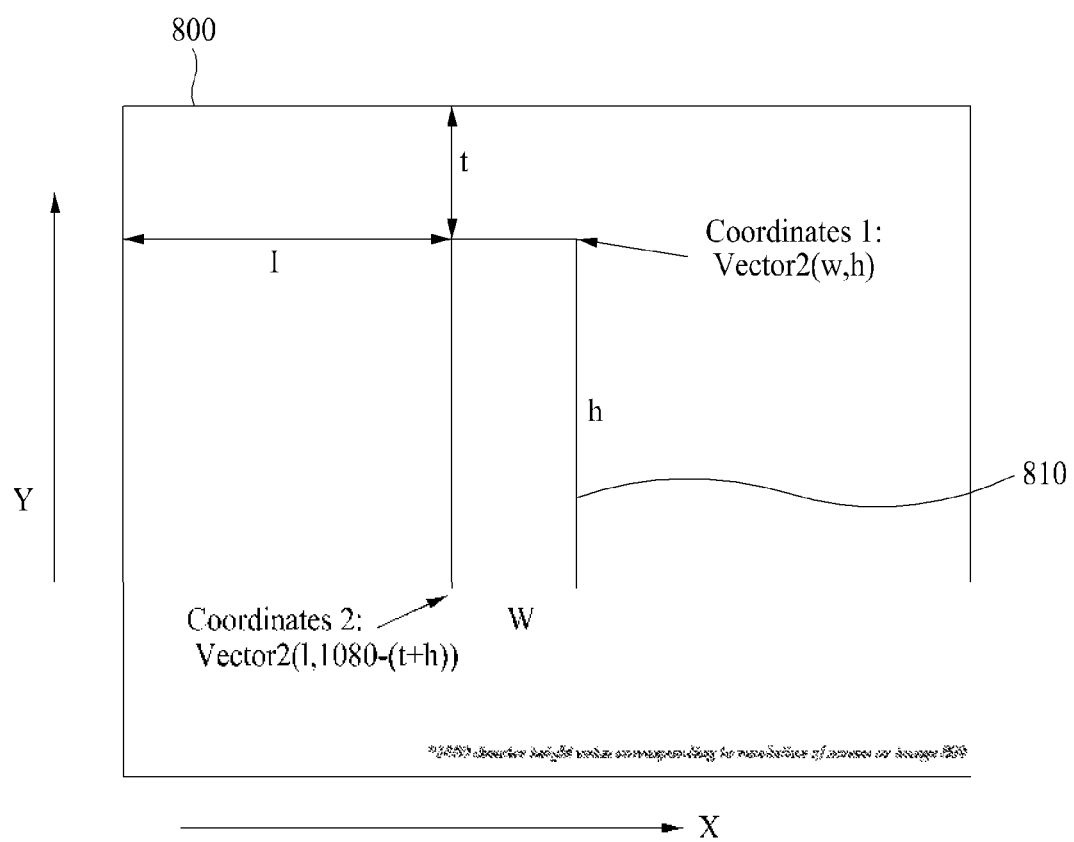
FIG. 8 illustrates a method of converting location information of an object to coordinates that represent a point on the object according to an example.

In this regard, FIG. 8 illustrates a method of converting location information of an object to coordinates that represent a point on the object according to an example.

In the illustrated example, a screen or an image 800 may represent an image captured by the camera 350 or a screen on which the corresponding image is displayed. An object 810 may correspond to the identified object 360 by the computer system 810 and may represent the bounding box of the identified object 360. Also, distance information from the edge of the image 800 or the screen to the object 810 may be defined as 1, t. Meanwhile, size information of the object 810 may be defined as h (height or vertical) and w (width or horizontal).

The content creator 50 may convert the location information (1, t, h, w) of the object 810 to coordinates of the object 810 (e.g., size coordinates of the object 810: Vector2 (w,h) and start coordinates Vector2 (1,1080−(t+h)) of the object 810. Here, 1080 may represent a height value corresponding to a resolution of the screen or the image 800. That is, the content creator 50 may convert the location information (objs) of the object 810 that represents the distance information of the object 810 to coordinates of the object 810. Such coordinates may also be referred to as rect value of the object 810.

In operation 520, the content creator 50 may convert first rotation angle information (e.g., y-axis rotation angle information (tt_y) of the message 700) used to rotate the motor 20 of the driving unit 40 (or camera 350) based on the aforementioned pan information and second rotation angle information (e.g., x-axis rotation angle information (tt_x) of the message 700) used to rotate the motor 20 of the driving unit 40 (or camera 350) based on the aforementioned tilt information to a rotation value for the y-axis and a rotation value for the x-ais of a virtual camera that views the correspondence object, respectively. The virtual camera may represent a virtual camera that views the correspondence object to define (or display) the correspondence object at a location corresponding to the first location in a correspondence space corresponding to a space in which the object 340 is placed.

Figure 9:
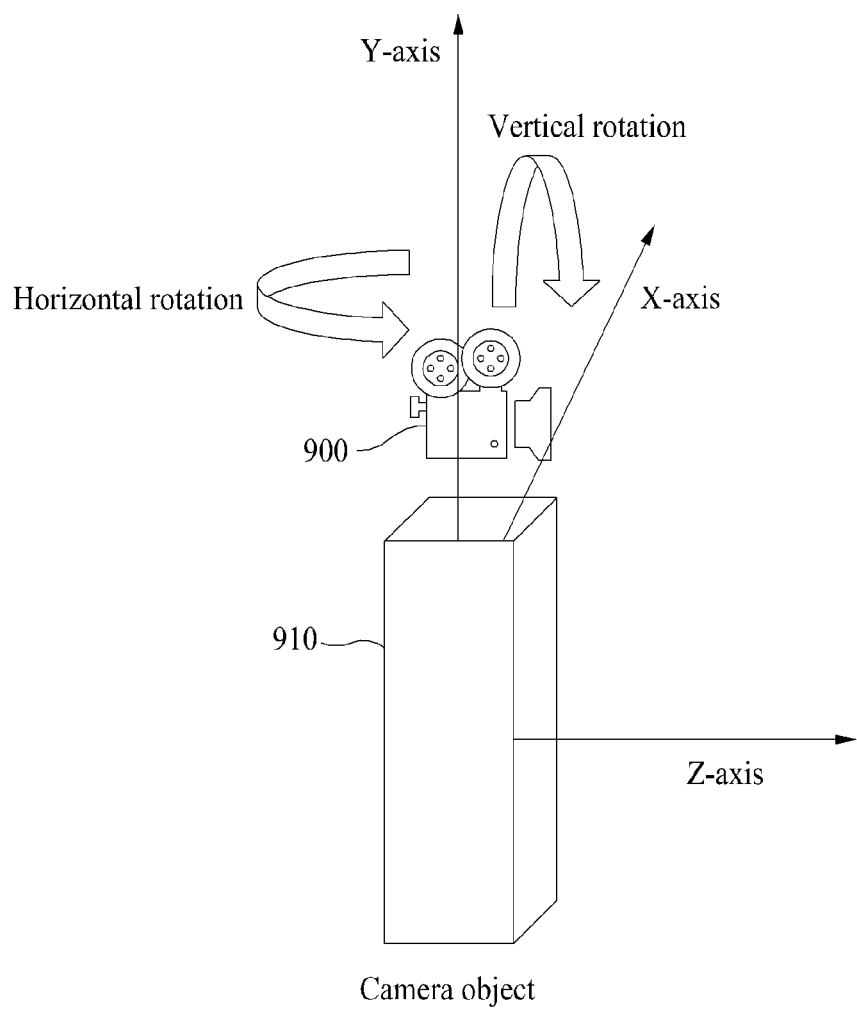
FIG. 9 illustrates a method of converting rotation angle information of a camera that tracks an object to a rotation value of a virtual camera that views a virtual object, a correspondence object, according to an example.

In this regard, FIG. 9 illustrates a method of converting rotation angle information of a camera that tracks an object to a rotation value of a virtual camera that views a virtual object, a correspondence object, according to an example.

FIG. 9 illustrates a virtual camera 900, a camera object 910 that represents the virtual camera 900, and three axes for rotation of the virtual camera 900. The aforementioned first rotation angle information may be converted to a rotation value corresponding to a horizontal rotation angle of the virtual camera 900 in FIG. 9 and the aforementioned second rotation angle information may be converted to a rotation value corresponding to a vertical rotation angle of the virtual camera 900 in FIG. 9. Therefore, pan and/or tilt rotation of the camera 350 in a space of the real world may be converted to pan and/or tilt rotation of the virtual camera 900 in a correspondence space corresponding to the space.

In operation 530, the content creator 50 may convert the aforementioned zoom information (i.e., zoom level (zl) of the message 700) to a FOV value of the virtual camera. The virtual camera may have a FOV value corresponding to the zoom level (zl) of the camera 350 and may define (or display) the correspondence object with the first size in the correspondence space corresponding to the space in which the object 340 is displayed. The FOV value may be a value related to an angle of view of the virtual camera.

Figure 10:
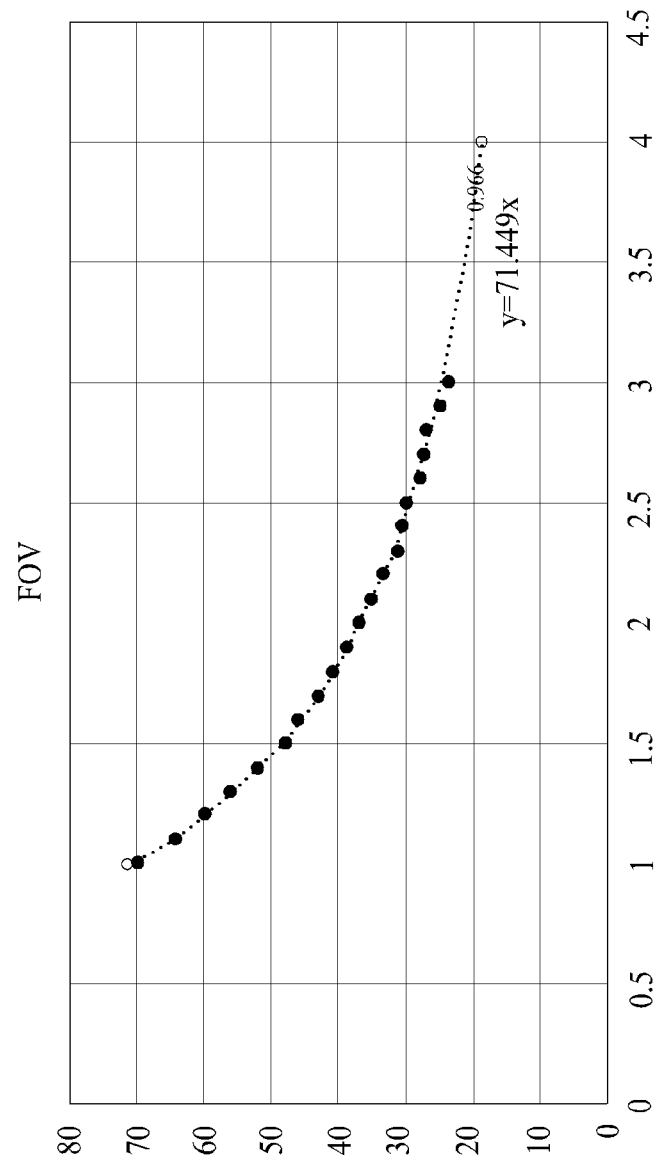
FIG. 10 illustrates a method of converting zoom information (i.e., zoom level information) of a camera that tracks an object to a field of view (FOV) value of a virtual camera that views a virtual object, a correspondence object, according to an example.

In this regard, FIG. 10 illustrates a method of converting zoom information (i.e., zoom level information) of a camera that tracks an object to a FOV value of a virtual camera that views a virtual object, a correspondence object, according to an example.

A graph of FIG. 10 may represent a relationship between a zoom level of the camera 350 and a FOV value of the virtual camera. For example, the x-axis of the graph may represent the zoom level of the camera 350 and the y-axis may represent the FOV value of the virtual camera. According to the relationship defined in the graph, the FOV value of the virtual camera corresponding to the zoom level of the camera 350 may be determined. The illustrated graph may be empirically acquired.

In operation 540, the content creator 50 may determine reference coordinates of the correspondence object on the correspondence space corresponding to the space in which the object 340 is placed, based on the virtual camera's rotation value for the y-axis, rotation value for the x-axis, and FOV value, and the coordinates according to operations 510 to 530. The reference coordinates may represent the origin or world coordinates as coordinates of reference used to create the correspondence object.

In operation 550, the content creator 50 may create the correspondence object that is represented as a 3D object in the digital twin content based on the determined reference coordinates.

Figure 11:
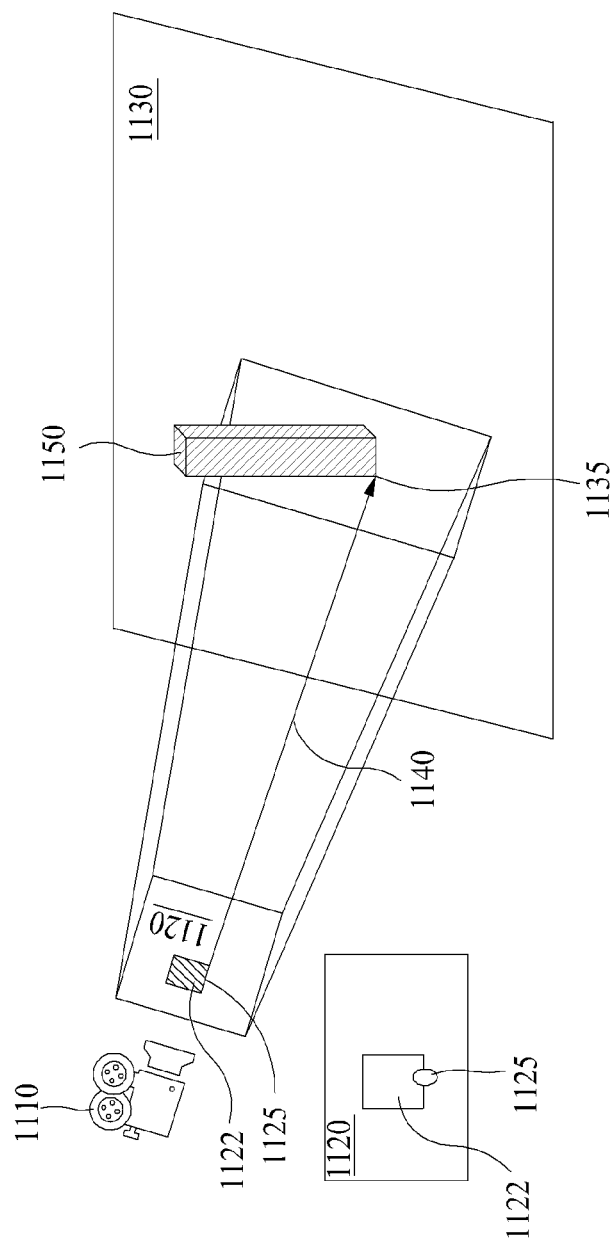
FIG. 11 illustrates a method of determining reference coordinates from an object two-dimensionally represented in a space and creating a three-dimensional (3D) object, a correspondence object, based on the reference coordinates according to an example.

In this regard, FIG. 11 illustrates a method of determining reference coordinates from an object two-dimensionally represented in a space and creating a three-dimensional (3D) object, a correspondence object, based on the reference coordinates according to an example.

FIG. 11 illustrates a virtual camera 1110, an image captured by the camera 350 of the computer system 100 or a screen 1120 on which the corresponding image is displayed, and an object 1122 defined on the image or the screen 1120. The object 1122 may correspond to the object 810 of FIG. 8.

The content creator 50 may determine a point 1135 at which a projection line 1140 from the virtual camera 1110 that passes through coordinates of a predetermined point on the object 1122 (e.g., a center point 1125 of base of the object 1122) determined based on coordinates representing vertices of the object 1122 intersects a correspondence space 1130, as reference coordinates (hereinafter, also referred to as reference coordinates 1135). The projection line 1140 may be a ray from the virtual camera 1110. The projection line 1140 maybe a virtual line.

For example, the object 1122 may be a bounding box that surrounds the corresponding object 1122.

The predetermined point, for example, the center point 1125 on the object 1122 for determining reference coordinates 1135 may be a center point of base of the bounding box. The reference coordinates 1135 determined accordingly may be world coordinates for a correspondence object 1150 created as coordinates on the correspondence space 1130 corresponding to the center point 1125.

The correspondence object 1150 created based on the reference coordinates 1135 may be a hexahedron created based on the reference coordinates 1135, world coordinates. That is, the correspondence object 1150 may be created in a form of a 3D bounding box with the reference coordinates 1135 as the origin.

Accordingly, the content creator 50 may create the digital twin content for the space by creating the correspondence object 1150 placed in the correspondence space 1130 corresponding to the object 340 placed in the space. The created digital twin content may accurately reflect placement of the object 340 and movement of the object in the real world.

Although the object 340 moves in the space of the real world, the content creator 50 may determine the reference coordinates 1135 for the object 1122 that is tracked in real time and may create the correspondence object 1150. The created correspondence object 1150 may be represented to move in the digital twin content, by reflecting movement of the object 340 in the space of the real world.

Meanwhile, when creating the 3D correspondence object 1150 from the object 1122, any technology for converting 2D coordinates (e.g., the aforementioned rect value) of the object 1122 to 3D coordinates may be applied. Further description related thereto is omitted.

Description related to technical features made above with reference to FIGS. 1 to 4 may apply as is to FIG. 5 and FIGS. 7 to 11 and thus, repeated description is omitted.

Figure 6:
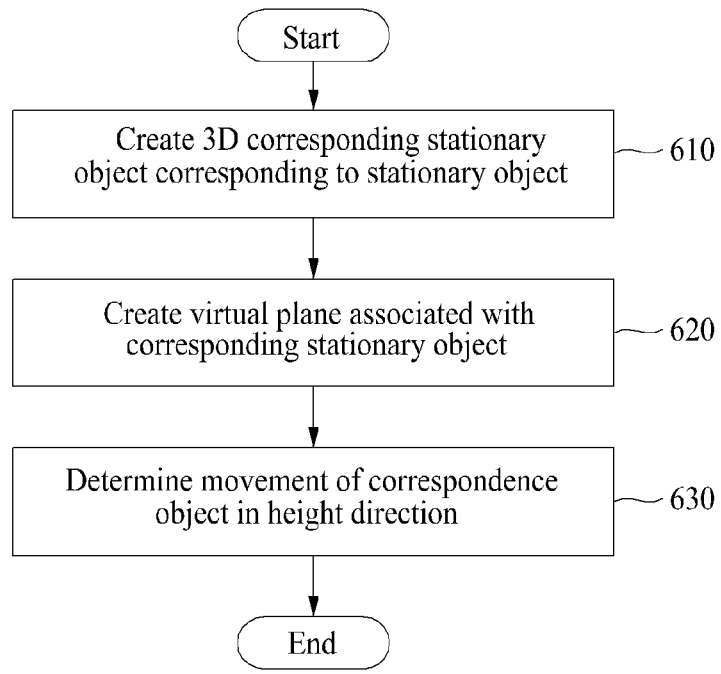
FIG. 6 is a flowchart illustrating a method of creating digital twin content that expresses a movement of a correspondence object corresponding to an object of a space in a y-axis direction (i.e., height direction) as a method of creating digital twin content for a space by a content creator according to an example.

FIG. 6 is a flowchart illustrating a method of creating digital twin content that represents a movement of a correspondence object corresponding to an object of a space in a y-axis direction (i.e., height direction) as a method of creating digital twin content for a space by a content creator according to an example.

A method of creating digital twin content that reflects 3D movement (i.e., movement in a height (z-axis) direction) of the object 340 in a space is further described with reference to FIG. 6.

As described above, a movement of the object 340 in the space may be represented as a movement of a correspondence object in a correspondence space in the digital twin content.

Meanwhile, although not illustrated in FIG. 3B, a stationary object that is fixed without moving may be present in the space. The object 340 may move in a height direction in a positional relationship with the stationary object.

For example, when the stationary object is a telephone pole, a ladder, or other stand and the object 340 is a person, there may be a case in which the object 340 moves in the height direction along the stationary object (i.e., climbs the telephone pole). The digital twin content created in the example embodiment may accurately represent a movement of the object 340 in this case as a movement of the correspondence object. That is, although the object 340 moves in the height direction, a 2D movement of the object 340 may be simply defined on the image captured by the camera 350 or the screen of the computer system 100. However, a movement of the correspondence object in the height direction may be represented in the digital twin content that is three-dimensionally created.

Hereinafter, further description will be made with reference to operations 610 to 630 and FIGS. 12 and 13.

In operation 610, the content creator 50 may create a corresponding stationary object as a 3D object corresponding to a stationary object placed in a space, in a correspondence space (virtual space) corresponding to the space in which the object 340 moves. The method of creating the correspondence object described above with reference to FIG. 5 and FIGS. 7 to 11 may be applied alike to a method of creating a corresponding stationary object and thus, repeated description is omitted.

In operation 620, the content creator 50 may create a virtual plane associated with the corresponding stationary object created in operation 610. The virtual plane refers to a virtual plane defined on the correspondence space and may be a plane for representing a movement of the correspondence object in a height direction.

In operation 630, the content creator 50 may determine the movement of the correspondence object in the height direction (y-axis direction) based on the created virtual plane.

Figure 12:
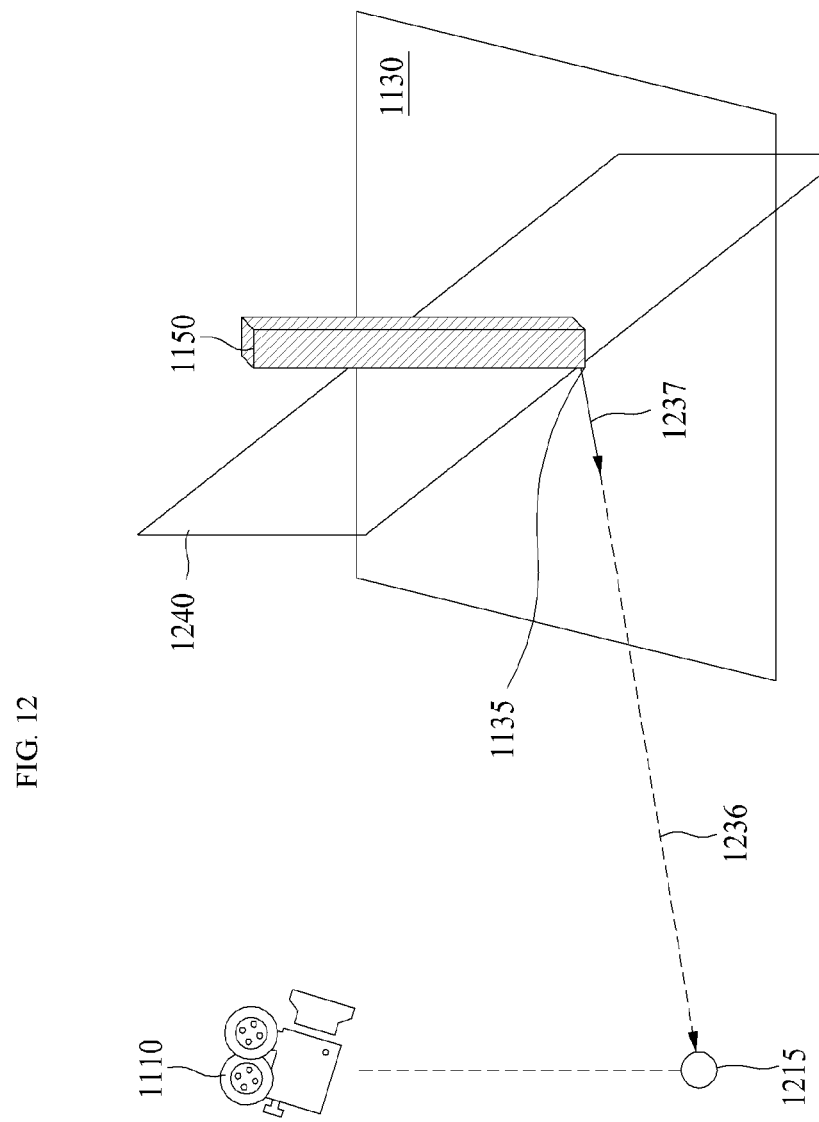
FIG. 12 illustrates a method of creating a virtual plane for representing a movement of a correspondence object corresponding to an object of a space in a y-axis direction (i.e., height direction) according to an example.
Figure 13:
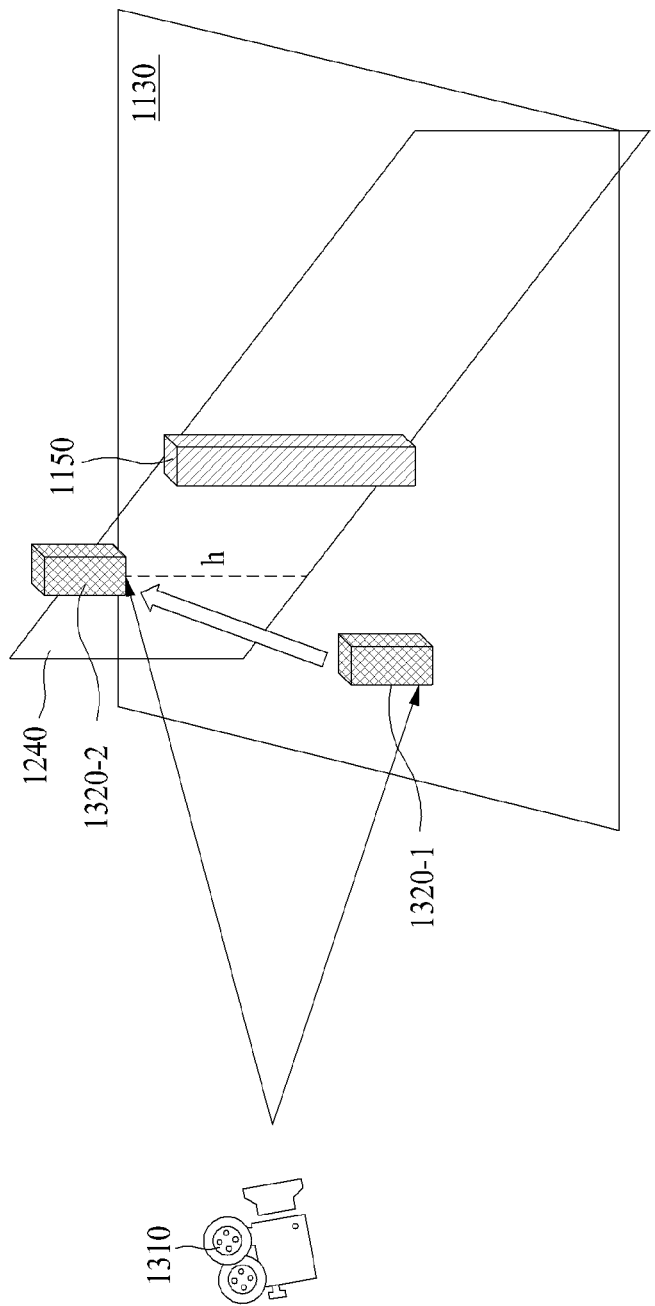
FIG. 13 illustrates a method of creating digital twin content that represents a movement of a correspondence object in a y-axis direction (i.e., height direction) using a virtual plane according to an example.

In this regard, FIG. 12 illustrates a method of creating a virtual plane for representing a movement of a correspondence object corresponding to an object of a space in a y-axis direction (i.e., height direction) according to an example, and FIG. 13 illustrates a method of creating digital twin content that represents a movement of a correspondence object in a y-axis direction (i.e., height direction) using a virtual plane according to an example In FIG. 12, a virtual plane 1240 is defined and the correspondence object 1150 is illustrated as the corresponding stationary object 1150.

The content creator 50 may create the virtual plane 1240 perpendicular to a surface of the correspondence space 1130 (i.e., ground surface on which the corresponding stationary object 1150 is placed) based on reference coordinates 1215 of the virtual camera 1110 that views the corresponding stationary object 1150 and the reference coordinates 1135 of the corresponding stationary object 1150. The virtual space 1240 may be created to be perpendicular to a vector 1236, 1237 that connects the reference coordinates 1215 of the virtual camera 1110 that views the corresponding stationary object 1150 and the reference coordinates 1135 of the corresponding stationary object 1150. That is, the vectors 1236 and 1237 may be normal vectors of the virtual plane 1240. The virtual plane 1240 may be a virtual wall for representing the movement of the correspondence object in the height direction. The reference coordinates 1215 of the virtual camera 1110 may be coordinates of the origin of the virtual camera 1110.

Therefore, the virtual plane 1240 illustrated in FIG. 12 may be created. A movement of the object 340 in the height direction in the space of the real world may be represented as a movement of the correspondence object on the virtual plane 1240.

In an example embodiment, if location information (or an amount of change) of the object 360, 1122 acquired by tracking the object 340 meets a predetermined condition, the content creator 50 may determine that the object 340 moves in the height direction and may represent a movement of the object 340 in the height direction as a movement of the correspondence object on the virtual plane 1240.

Describing in more detail with reference to FIG. 13, for example, the content creator 50 may determine a movement of a correspondence object 1320-1, 1320-2 (according to a movement of the tracked object 340) as a movement of a correspondence object 1320-1, 1320-2 in a y-axis direction (height direction) in a case in which a distance between the correspondence object 1320-1, 1320-2 and the virtual plane 1240 is less than a predetermined first distance. Here, the movement of the correspondence object 1320-1, 1320-2 may be represented on the virtual plane 1240. The case in which the distance between the correspondence object 1320-1, 1320-2 and the virtual plane 1240 is less than the first distance may represent a case in which a location of the correspondence object 1320-1, 1320-2 determined based on location information of the object 340 is within the virtual plane 1240 or within a predetermined range from the virtual plane 1240.

Alternatively/additionally, the content creator 50 may determine a movement of the correspondence object 1320-1, 1320-2 as a movement of the correspondence object 1320-1, 1320-2 in the y-axis direction (height direction) in a case in which an amount of change in the zoom information on the object 340 or an amount of change in the FOV value for the correspondence object 1320-1, 1320-2 for an amount of change in coordinates (location information) of the identified object 360, 1120 according to the movement of the tracked object 340 is less than a predetermined second value. Here, the movement of the correspondence object 1320-1, 1320-2 may be represented on the virtual plane 1240. That is, despite a relatively large amount of change in the location information of the identified object 360, 1120 (i.e., despite of a movement of the object 340 on a 2D image and screen), a change in a zoom level of a camera that tracks the object 340 (consequently, a change in a FOV value of a virtual camera 1310) may not be relatively great. In this case, the corresponding object 340 may be determined to be moving in the height direction.

For example, in a case in which the correspondence object 1320-1 is located on or close to the virtual plane 1240 according to a movement of the correspondence object 1320-1, if the aforementioned condition is met, the correspondence object 1320-1 may move in a height direction such as the correspondence object 1320-2 ($h$).

Therefore, in an example embodiment, when the object 340 moves in the height direction, a 2D movement of the object 340 may be simply defined on the image captured by the camera 350 or the screen of the computer system 100. However, in the created 3D digital twin content, a movement of a correspondence object in the height direction may be represented as a movement ($h$) on the virtual plane 1240. As such, the digital twin content created through an example embodiment may track a 3D movement of the object 340 in the space of the real world in real time and may represent the 3D movement as a 3D movement of the correspondence object.

Meanwhile, the method of determining the reference coordinates 1135 described above with reference to FIG. 11 may be applied alike to definition of the correspondence object 1320-2 on the virtual plane 1240. For example, reference coordinates of the correspondence object 1320-2 on the virtual plane 1240 may be determined by a projection line of the virtual camera 1310. A point at which the projection line of the virtual camera 1310 meets the virtual plane 1240 may be reference coordinates (i.e., world coordinates) of the correspondence object 1320-2 and thus, the correspondence object 1320-2 may be created and defined on the virtual plane 1240.

The systems and/or apparatuses described herein may be implemented using hardware components, software components, and/or combination thereof. For example, apparatuses and components described herein may be implemented using one or more general-purpose or special purpose computers, such as, for example, a processor, a controller, an arithmetic logic unit (ALU), a digital signal processor, a microcomputer, a field programmable array (FPA), a programmable logic unit (PLU), a microprocessor, or any other device capable of responding to and executing instructions in a defined manner. A processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that the processing device may include multiple processing elements and/or multiple types of processing elements. For example, the processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The methods according to the example embodiments may be recorded in non-transitory computer-readable media including program instructions to implement various operations embodied by a computer. Also, the media may include, alone or in combination with the program instructions, data files, data structures, and the like. Program instructions stored in the media may be those specially designed and constructed for the purposes, or they may be of the kind well-known and available to those having skill in the computer software arts. Examples of non-transitory computer-readable media include magnetic media such as hard disks, floppy disks, and magnetic tapes; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The hardware device may be configured to operate as at least one software module to perform operations of the example embodiments, or vice versa.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of creating digital twin content for a space based on an object recognition in the space, performed by a computer system, the method comprising:
   identifying an object in the space using a camera included in the computer system;
   determining a value of a parameter associated with the camera to define the identified object with a predetermined first size at a predetermined first location on an image captured by the camera of the computer system or a screen on which the image is displayed, the object being defined with the first size at the first location on the image or the screen by at least one of i) that the camera is rotated by a driving unit and ii) a zoom of the camera is adjusted, based on the determined value of the parameter; and
   using a control result value of the camera based on the determined value of the parameter and location information of the identified object on the image or the screen to create the digital twin content for the space,
   wherein the digital twin content includes a correspondence object corresponding to the identified object, and
   by iteratively performing the identifying, the determining, and the using as the object moves, the moving object is tracked to be defined with the first size at the first location on the image or the screen and a movement of the object is represented as a movement of the correspondence object in the digital twin content, and
   wherein the parameter includes pan information, tilt information, and zoom information of the camera,
   in response to rotation of the camera or the computer system equipped with the camera as a motor of the driving unit is controlled by first rotation angle information of the camera based on the pan information and second rotation angle information of the camera based on the tilt information, the camera is controlled to define the object at the first location on the image or the screen,
   as the camera is controlled to zoom out or zoom in according to the zoom information, the camera is controlled to define the object with the first size at the first location on the image or the screen, and
   the digital twin content is created by processing the first rotation angle information, the second rotation angle information, the zoom information, and the location information with a three-dimensional (3D) content creator.

2. The method of claim 1, wherein the computer system and the driving unit are configured to communicate through a first wireless communication scheme, and
   the computer system and the 3D content creator are configured to communicate through a second wireless communication scheme.

3. The method of claim 1, wherein the digital twin content is created by operations performed by the 3D content creator, and
   the operations comprise:
   an operation of converting the location information to coordinates that represent a point on the object;
   an operation of converting the first rotation angle information and the second rotation angle information to a rotation value of a virtual camera that views the correspondence object for a y-axis and a rotation value of the virtual camera for an x-axis, respectively;
   an operation of converting the zoom information to a field of view (FOV) value of the virtual camera;

an operation of determining reference coordinates of the correspondence object in a correspondence space corresponding to the space based on the virtual camera's rotation value for the y-axis and rotation value for the x-axis, the FOV value, and the coordinates; and an operation of creating the correspondence object as a 3D object based on the reference coordinates.

4. The method of claim 3, wherein the operation of converting the location information to the coordinates comprises an operation of converting distance information from an edge of the image or the screen included in the location information to the object and size information of the object to coordinates that represent vertices on the object, and the operation of determining the reference coordinates determines a point at which a projection line from the virtual camera that passes through coordinates of a predetermined point on the object determined based on the coordinates interests the correspondence space as the reference coordinates.

5. The method of claim 4, wherein the object is a bounding box, the predetermined point on the object is a center point of base of the bounding box, the reference coordinates are world coordinates as coordinates in the correspondence space corresponding to the center point, and the correspondence object is a hexahedron created based on the world coordinates.

6. The method of claim 3, wherein a movement of the object in the space is represented as a movement of the correspondence object in the correspondence space, and the operations comprise:

an operation of creating a corresponding stationary object as a 3D object corresponding to a stationary object placed on the space in the correspondence space;

an operation of creating a virtual plane associated with the corresponding stationary object; and an operation of determining a movement of the correspondence object in a height direction based on the virtual plane.

7. The method of claim 6, wherein the operation of creating the virtual plane creates the virtual plane perpendicular to a surface of the correspondence space based on reference coordinates of the virtual camera that views the corresponding stationary object and reference coordinates of the corresponding stationary object.

8. The method of claim 7, wherein the operation of creating the virtual plane creates the virtual plane perpendicular to a vector that connects the reference coordinates of the virtual camera that views the corresponding stationary object and the reference coordinates of the corresponding stationary object.

9. The method of claim 6, wherein the operation of determining the movement the correspondence object in the height direction determines that the correspondence object moves in the height direction in at least one of a case in which a distance between the correspondence object and the virtual plane is less than a predetermined first distance and a case in which an amount of change in the zoom information or the FOV value for an amount of change in coordinates of the object according to the movement of the object is less than a predetermined second value, and a movement of the correspondence object in the height direction in the correspondence space is represented.

* * * * *